United States Patent
Renz

(10) Patent No.: US 9,816,826 B2
(45) Date of Patent: Nov. 14, 2017

(54) TECHNIQUE FOR CORRECTING DIGITIZED MAP DATA

(71) Applicant: ELEKTROBIT AUTOMOTIVE GmbH, Erlangen (DE)

(72) Inventor: Sigrid Renz, Langenzenn (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 57 days.

(21) Appl. No.: 14/474,948

(22) Filed: Sep. 2, 2014

(65) Prior Publication Data

US 2015/0081217 A1 Mar. 19, 2015

(30) Foreign Application Priority Data

Sep. 13, 2013 (EP) ..................................... 13004489

(51) Int. Cl.
*G01C 21/32* (2006.01)
*G01C 21/36* (2006.01)

(52) U.S. Cl.
CPC ............. *G01C 21/36* (2013.01); *G01C 21/32* (2013.01)

(58) Field of Classification Search
CPC .................................. G01C 21/32; G01C 21/36
See application file for complete search history.

(56) References Cited

U.S. PATENT DOCUMENTS

| 2005/0058155 | A1* | 3/2005 | Mikuriya | H04Q 3/0062 370/474 |
| 2009/0228207 | A1* | 9/2009 | Sasano | G01C 21/3614 701/414 |
| 2010/0179755 | A1* | 7/2010 | Kohno | G01C 21/32 701/532 |

(Continued)

FOREIGN PATENT DOCUMENTS

| CN | 101458092 A | 6/2009 |
| CN | 101517360 A | 8/2009 |

(Continued)

OTHER PUBLICATIONS

Office Action dated Jul. 14, 2015, issued in counterpart Japanese Patent Application No. 2014-186662, with English translation (13 pages).

(Continued)

*Primary Examiner* — Thomas Ingram
(74) *Attorney, Agent, or Firm* — Westerman, Hattori, Daniels & Adrian, LLP

(57) ABSTRACT

A technique is described for correcting digitized map data stored in a map database of a navigation device, wherein the map data comprises routing data in the form of route links and shape points, and wherein each route link is associated with a sequence of shape points representing a course of a road segment that is displayable on a navigation screen. A method aspect comprises the steps of detecting a first user input operation indicative of a selection of a road segment displayed on the screen, detecting at least one second user (Continued)

input operation indicative of a graphical manipulation of the course of the selected road segment on the screen, generating on basis of the detected second user input operation corrected routing data reflecting the manipulated course of the selected road segments and storing the corrected routing data in the map database.

13 Claims, 5 Drawing Sheets

(56) References Cited

U.S. PATENT DOCUMENTS

2012/0331009 A1  12/2012  Omer et al.
2014/0222340 A1* 8/2014  Celia ................... G01C 21/32
                                              701/533

FOREIGN PATENT DOCUMENTS

| | | |
|---|---|---|
| CN | 102032910 A | 4/2011 |
| DE | 69427388 T2 | 9/2001 |
| DE | 112005000048 T5 | 7/2006 |
| DE | 102007011151 A1 | 9/2007 |
| DE | 102008011001 A1 | 2/2009 |
| DE | 102008020447 A1 | 3/2009 |
| DE | 102010042873 A1 | 4/2011 |
| DE | 102011007267 A1 | 10/2012 |
| JP | 2009-210468 A | 9/2009 |
| JP | 2011-53226 A | 3/2011 |
| WO | 2008/019879 A2 | 2/2008 |
| WO | 2013/042072 A1 | 3/2013 |

OTHER PUBLICATIONS

'TomTom Start' Reference Guide DE, 2009 (41 pages).
"Map database management" from Wikipedia dated Mar. 17, 2013 (6 pages).

* cited by examiner

TECHNIQUE FOR CORRECTING DIGITIZED MAP DATA

TECHNICAL FIELD

The present disclosure generally relates to navigation-related aspects. In particular, the disclosure relates to a technique for correcting digitized map data stored in a map database of a navigation device.

BACKGROUND

Modern navigation devices, including smart phones and tablet PCs, implement a variety of navigation functionalities, such as route calculation between predetermined geographic positions, provision and visualization of digital maps, visualization of road networks and calculated routes, location and visualization of Point of Interests, or POIs, search functionalities for POIs, street names and location names, route guidance functionalities, provisioning of traffic information data, and so on. All these functionalities require large amounts of navigation information in digitized form that has to be appropriately organized and connected with each other. For this purpose, at least routing data representing a real road network along with associated attributes is organized in relational databases and stored onboard of the device (for instance, on an SD card). Other information associated with, for instance, traffic information may be also provided online.

Generally, routing data provided by map data suppliers comprises route link data and route node data. Route node data represents junctions of the road network and comprises pairs of longitude (long) and latitude (lat) coordinate data. Route node data further comprises junction attributes defining the type and shape of junctions or intersection as well as how route links joining a node have to be connected with each other. Thus, route node data mediates connections between adjacent links joining the node. Route link data, in turn, represents road segments between consecutive intersections. It comprises a plurality of road segment attribute information, like the road type, road shape, road classification, lane information, travel direction, predefined travel velocity, and so on.

The shape (i.e., course) of a road segment can be described by a sequence of shape points associated with the corresponding route link. Each shape point comprises longitude and latitude coordinates and represents the shape of a portion of the corresponding road segment. Distances between consecutive shape points may amount to several tenths of meters (for instance, 10 to 20 meters for winding road sections and approximately 40 meters for straight road portions). Adjacent shape points may be connected by shape lines to form a so called road geometry line in form of a polyline. Thus, each route link is associated with a sequence of shape points and shape lines in between.

It may happen that routing data are inaccurately or erroneously digitalized such that the digitized routing data does not correctly reflect the geographic position or course of corresponding road segments. Still further, the road network may be subjected to continuous changes. Such continuous changes may, for instance, comprise the straightening of winding road portions, the transformation of cross-like intersections into roundabouts, the relocation of roads or intersections, and so on. Such changes are usually taken into account by future database updates.

Deviations in the road network geometry between the digitalized map data and the real road network may cause problems during route guidance, in map displaying and map matching (map matching defines a technique in which a currently measured geographic position (e.g., GPS or Galileo position) is adjusted with the geographic position of a visualized map on the navigation device screen). For instance, when travelling along a pre-calculated route comprising a street being inaccurately digitized, it may occur that during route guidance the navigation device erroneously assigns a measured user position to another street which deviates from the pre-calculated route. In such a case the routing algorithm may perform a re-routing and, as a consequence, maneuver instructions may be generated and outputted that are not compatible with the course of the pre-calculated route the user is currently following.

Currently, such annoying situations cannot be immediately remedied. The user has no possibility to immediately fix erroneous digitalization of map data by himself. The user can only report digitalization problems to the map provider. The user has to then wait until the map data supplier releases a map data update. However, even in case a new update is released, there is no guarantee that the error has been properly corrected. As such, the user has to deal with wrong digitalization over a longer time period which is very inconvenient for him.

Nowadays, first approaches for overcoming digitalization problems are available. For instance, TomTom has recently introduced a technique called "map share", in which a user is allowed to add, delete and modify POI data. In addition, "map share" allows a user to correct attributes associated with route links such as the correction of velocity limitations or the correction of street names or the change in the turning behavior. Such a correction can be performed by marking the concerned road on the display and by inputting corrections following a displayed menu structures. The corrected data are then sent to a provider which approves the correction and provides the approved corrections to other users. With "map share" the course (shape) of road networks is not correctable.

SUMMARY

It is therefore an object to provide a simple and self-explaining technique supporting a user in immediately fixing erroneously digitized map data.

According to a first aspect, a method of correcting digitized map data stored in a map database of a navigation device is provided, wherein the map data comprises routing data in form of route links and shape points, and wherein each route link is associated with a sequence of shape points representing a course of a road segment for display on a navigation screen. The method comprises the steps of detecting a first user input operation indicative of a selection of a road segment displayed on the screen; detecting at least one second user input operation indicative of a graphical manipulation of the course of the selected road segment on the screen; generating on basis of the detected second user input operation corrected routing data reflecting the manipulated course of the selected road segments and storing the corrected routing data in the map database.

The described correction technique may be applicable to map data provided by a map data supplier and stored in the map database of the navigation device. In this context, the described correction technique may be applicable to any map data standard (used by the map data supplier) organizing routing data for a road network in form of route links, shape points and route nodes. In particular, the technique presented herein may be implemented in the context of the Navigation Data Standard, or NDS, format representing a navigation system independent physical storage format for map data. In the NDS terminology, road segments are further divided into route links and base links. Base link data are associated with road segments lying within a geographic tile, while route link data are associated with road segments extending over two or more tiles (note NDS partitions the map database into map data sub-structures, wherein each sub-structure represents map data associated with a geographic tile of pre-defined dimensions). Both link types are associated with the same attributes and are described by sequences of shape points. They mainly differ from each other in how the two link types are stored within the NDS database structure. However, since the present technique does not depend on storage details, the presented technique is applicable for both link types. The wording "route link" used herein has to be construed to comprise both types of NDS links. An NDS implementation of the presented technique is described in more detail in conjunction with FIG. 5.

The sequence of shape points associated with a route link may define a road geometry line in form of a polyline that fully represents the course of a road segment. For this purpose, adjacent shape points of the sequence may be connected by shape lines. The shape lines may represent, in a first order approximation, linear connections between adjacent shape points. The direction of the road geometry line is defined by the sequence of these points and may correspond to the direction of the route link to which it belongs. The sequence of shape points (e.g., the number of points per sequence) and the geometry of the shape lines for defining the road geometry may depend on the map data supplier providing the map database.

The first user input operation may comprise a selection operation of one or more displayed road network elements, such as road segments, junction nodes and displayed shape points. The selection operation may be a graphical selection operation by touching (when a touch screen is implemented) or selecting via mouse cursor the displayed element to be selected.

The at least one second user input operation may be at least one graphical displacement operation (for instance, a drag and drop operation, a rotation operation, a stretching operation, a compression operation, etc.) applied to the selected element. The operation may be performed by touch operations (for instance, by moving a finger or stylus over the screen surface in case a touch screen is used) or by moving a mouse cursor.

According to one variant the graphical manipulation of the course of the selected road segment by the at least one second user input may comprise a position displacement of at least one shape point of the sequence of shape points associated with the selected road segment. In this context, the graphical manipulation may consist in a positional variation (displacement) of the screen position of the at least one displayed shape point. The positional displacement of the at least one shape point can be performed in any direction on the screen.

The graphical manipulation of the course of the selected road segment by the at least one second user input may comprise a position displacement of an individual shape point displayed on the screen by shifting the shape point from the displayed screen position to a new screen position. Each displayed shape point may be shifted individually in order to change the local course defined by the corresponding shape point of the selected road segment. According to an alternative variant the graphical manipulation of the course of the selected road segment may comprise a common positional displacement of two or more (neighboring) shape points or of a plurality of shape points that are grouped together (manually, by a user input which selects and marks the shape points to be displaced together). The displacement of two or more neighboring shape points may be associated with shifting displayed shape lines connecting the two or more shape points from the displayed screen position to a new screen position.

According to a further variant the graphical manipulation of the course of the selected road segment on the screen may comprise collectively displacing all shape points associated with the selected road segment. Collectively displacing all shape points of a road segment may mean that all shape points of the selected road segment are subjected to substantially the same singular displacement operation applied to the road segment as a whole. The singular displacement operation may comprise at least one of a road segment translation, road segment rotation, a road segment stretching or road segment compression on the screen. A collective displacement may be indicated by grouping together (manually by the user) all shape points of the shape point sequence. Such a collective displacement of the displayed road segment may be advantageous in case the geographic position rather the shape of the segment is incorrectly or improperly reflected by the digitized data.

The at least one second user input may be detected by tracing the displacement of each shape point of the selected road segment and detecting a new screen position for each displaced shape point. In this context, the movement of each shape point relative to its initially displayed position on the screen may be tracked. In case a touchscreen is used, the second user input may comprise a touch input performed on the screen and the displacement is derived from a screen trace detected by sensing the movement of a finger or stylus on the screen. In addition, or alternatively, it is also conceivable that the second user input may comprise detecting a mouse cursor shift on the display.

The detected new screen position of each traced displaced shape point may be converted into new geographic position coordinates for each displaced shape point. For this purpose, the conversion step may comprise determining on basis of the displayed map (portion) a unique relationship between each screen position and the corresponding map position of the displayed map (portion). Each map position of the displayed map is associated with a pair of geographic coordinates (longitude and latitude) retrievable from the stored corresponding map data. In other words, the conversion step comprises determining a unique relationship between a screen coordinate system describing a two-dimensional position of each screen point and a (global or local) geographic coordinate system defined by the geographic coordinates of the displayed map (road network). The determined relationship between both coordinate systems may allow a unique assignment of each detected screen position to a corresponding geographic position of the displayed map.

According to a further variant the correcting of inaccurate digitized map data may comprise initially switching to an editing mode for activating the displayed road segments (and junction nodes) for graphically manipulations. The editing mode can be activated in response to a further user input indicating that the editing mode should be activated. Only when the editing mode is active graphical manipulations on the displayed navigation data may be performable. Otherwise the data may be locked for user manipulation in order to avoid unwanted manipulations by arbitrary user inputs. The editing mode may be accessible at any time.

Especially, the editing mode may be accessible while a route guidance or other navigation functions are active.

When the editing mode is activated the shape points of those displayed road segments may be visualized that are selected by the first user inputs. Alternatively, upon activating the editing mode the shape points of all displayed road segments may be visualized on the screen signaling the user that the displayed road segments are editable. The shape points support the user in fixing a wrongly digitized course of a road segment. The user can easily correct the course by simply moving the displayed shape points on the screen. As such course corrections and road segment position corrections can be simply performed by using the existing shape points (i.e., as provided by the map data supplier and stored in the map database) and without requiring a generation of new road segment data (i.e., shape point and shape line data).

A correction of wrongly digitized map data may require a correction reference which signals the correct course of road segments. According to one variant the current user position as detected by a position sensor may be displayed on the screen (in the editing mode) in conjunction with the displayed road network. For this purpose, the user position on the screen may be displayed without matching it to nearest neighboring road segments of the displayed road network (map matching as discussed in the introductory part). In such a case, deviations in the geometry between the displayed road segments on basis of digitized routing data and the real course of the road segments may become visible. According to a further variant it is also possible that, upon the editing mode is activated the evolution of the detected unmatched user position (i.e., the trace defined by unmatched user positions) is recorded and displayed on the screen. The user can then use the recorded trace to manually correct the course of a road segment.

Alternatively, or in addition to the displaying or tracking of current user positions, it is also conceivable that real images of portions of the displayed road network are superimposed to the displayed map data. The real images may represent a picture, a photograph, a video picture or other rendered images of a real road network portion. The real images may be superimposed to the displayed map when the editing mode is active. For this purpose, the real image may be appropriately scaled to the underlying displayed road network such that the same passages of a road network reflected by the image and by the road network display are appropriately aligned with each other. The superimposed image may be made transparent so that image and road network can be made visible at the same time.

New geographic coordinates corresponding to the detected new screen positions may be generated and assigned to the shifted displayed shape points. The new geographic coordinates may substitute the old geographic coordinates for the corresponding shape points in the map data. The substitution can be simply achieved by overwriting the stored old coordinate data by the new one in the map database. It should be thus possible to modify or correct digitalized route link data without requiring changes in the data structure. In addition, since only geographic coordinates are substituted the size of the map database may remain substantially the same even after the corrections. Alternatively, it may be also conceivable that additionally new shape points are generated and stored in the map data. In such a case the new shape points has to be additionally introduced in the map database structure.

The digitized routing data may further comprise route node data representing junctions of a road network, wherein displayed junction node can be selected on the screen by the first user input, wherein the selected junction mode can be further moved from a displayed screen position to a new screen position and further comprising the steps of: generating on basis of the detected second user input geographic position data for the route nodes corresponding to the detected new screen position of the moved junction node, and storing the generated geographic position data in the database.

Furthermore, a computer program product with program code is provided for carrying out the method when the computer program product is executed on a computer device (for instance a navigation device). For this purpose, the computer program product may be stored on a computer readable recording medium (e.g. a memory card or a read-only memory).

In addition, a navigation device is provided that is configured to correct digitized map data stored in a map database of the navigation device, the map data comprising routing data in the form of route links and shape points, wherein each route link is associated with a sequence of shape points representing a course of a road segment that is displayable on a navigation screen. The device comprises a detection unit configured to detect a first user input operation indicative of a selection of a road segment displayed on the screen, and to detect at least one second user input operation indicative of a graphical manipulation of the course of the selected road segment on the screen; a generation unit configured to generate on basis of the detected second user input operation corrected routing data reflecting the manipulated course of the selected road segment; and a storage unit configured to store the corrected routing data in the map database.

The device may further comprise a display unit with a screen configured to display road segment and road junctions on basis of the stored map data.

BRIEF DESCRIPTION OF THE DRAWINGS

Further details, aspects and advantages of the present disclosure described herein will become apparent from the following drawings, in which.

DETAILED DESCRIPTION

In the following description, for purposes of explanation and not limitation, specific details are set forth in order to provide for a thorough understanding of the technique presented herein. It will be apparent to one skilled in the art that this technique may be practised in other embodiments that depart from these specific details. For example, the embodiments will primarily be described in the context of a vehicle-based navigation device; however, this does not rule out the use of the present technique in conjunction with smart phones, tablet PCs, personal digital assistants (PDAs)

or other devices implementing navigation applications for use in vehicle navigation, pedestrian navigation or bicycle rider navigation.

Moreover, those skilled in the art will appreciate that the services, functions and steps explained herein may be implemented using software functioning in conjunction with a programmed microprocessor, using an Application Specific Integrated Circuit (ASIC), a Digital Signal Processor (DSP) or general purpose computer. It will also be appreciated that while the following embodiments are primarily described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1:
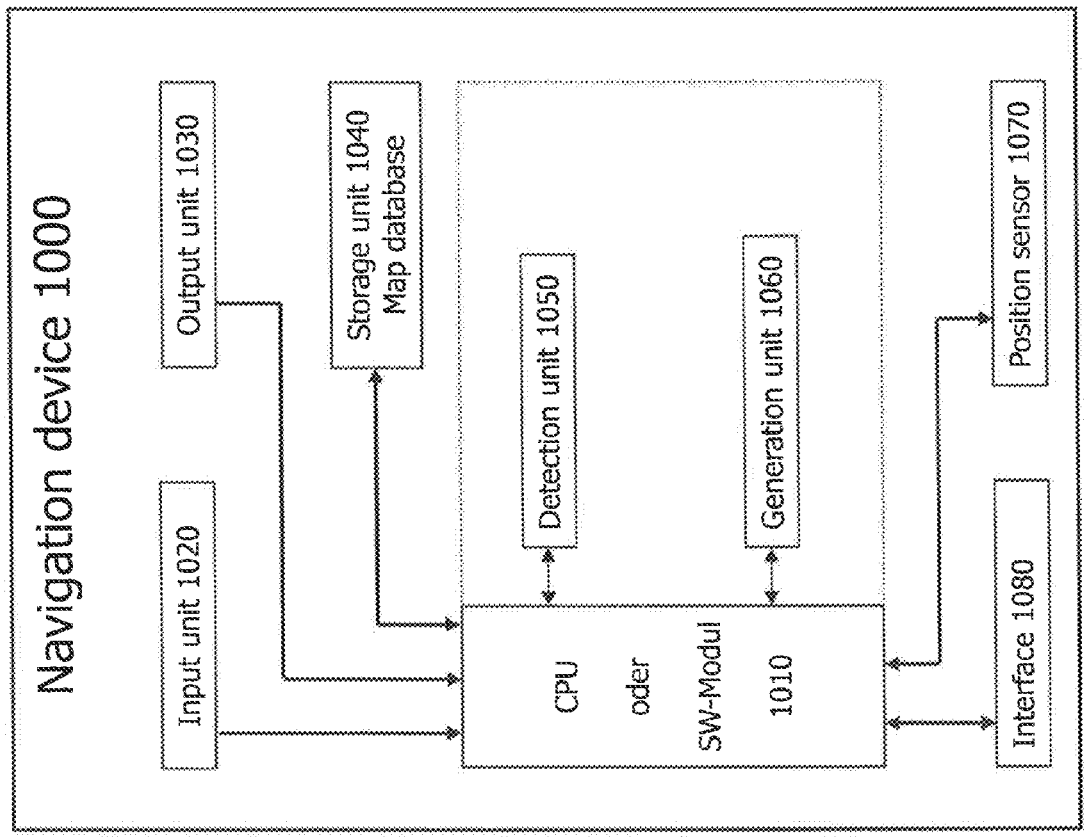
FIG. 1 illustrates an apparatus according to an exemplary embodiment of the present invention.

FIG. 1 shows, in the form of a block diagram, an embodiment of a navigation device 1000 (in the following denoted as device 100) allowing a graphical correction of digitized map data according to the present invention. The device 1000 may be a built-in navigation device or a personal navigation device (PND). Although the embodiments are described in connection with a road network, the present disclosure can be also applied to networks of cycle paths.

The device 1000 comprises a core functionality 1010 in the form of a central processing unit (CPU), a microprocessor, or in the form of a software module (SW module), an input unit 1020, an output unit 1030, a storage unit 1040, a detection unit 1050, a generation unit 1060, a position sensor 1070 and at least one communications interface 1080.

The at least one communications interface 1080 is configured to provide online connections with providers of map data and traffic information. Further, the at least one communications interface 1080 allows an online connection with other devices. Via the communications interface 1080 the device 1000 can receive updated map data and online traffic information. In addition, the device 1000 can share map data individually corrected by single users in accordance with the correction technique as described in detail below, by sending or receiving corrected map data over the interface 1080. For this purposes, the interface 1080 may be realized as a mixed hardware and software interface.

The position sensor 1070 is configured to detect a current user position. The position sensor 1070 may be realized as absolute position sensor detecting a geographic latitude and longitude information reflecting thus the current geographic position of the user relative to a global geographic coordinate system. Such an absolute position sensor may detect signals from the GPS, Galileo, Glonass or other global positioning systems. Alternatively, or in addition thereto, the position sensor 1070 may be realized as relative position sensor detecting the travelled distance and headings of a vehicle during travel. In such a case the absolute position of a vehicle during travel may be determined by dead reckoning principles.

The storage unit 1040 is configured to store map data in digitized form. The map data may be organized and structured according to a pre-defined data format in at least one database. For instance, the data in the database can be organized in accordance with the NDS format or assume any other format. The digitized map data are provided by a map data supplier. The format used to organize the map data is pre-defined by the map data supplier. The map data stored in the at least one database 1040 comprise at least route link data and associated shape point data indicative of the road geometry (i.e., the course) of road segments. Depending on the map database supplier, the route link data may comprise a variety of route link attributes describing, for instance, road type, road classification, lane information, travel direction, predefined travel velocity, etc. of the road segments. The shape point data comprise longitude and latitude information as well as road segment shape information in order to fully describe the course of the road segments. The map data further comprise organized route node data indicative of road junctions of a road network. The route nodes mediate a connection between adjacent route links joining the route nodes as described in the introductory part above. Route node data and route link data can be organized in relational tables defining unambiguous relations between route link data, shape points and route node data (as well as other available navigation data, such as name data). In this context, route link data are organized to reference to the adjacent route nodes and the route nodes are organized to reference to all route links joining a node. In the same way, shape points are organized to reference to the adjacent shape lines (road geometry connections between neighboring shape points).

In addition to the above-mentioned route node data, route link data and shape point data, the map database may comprise further navigation data associated with enhanced navigation functionalities such as POI data, orthoimage data, TMC data, digital terrain data, and so on. The amount of data may depend on the map data supplier. The present graphical correction technique is also applicable for map databases comprising digital data associated with enhanced navigation applications.

The input unit 1020 is designed to receive user input operations. Input operations may comprise user operations associated with the input of start points, end points or intermediate stops, or other relevant instructions or parameters required for specific route calculations. Input operations also comprise operations associated with map data manipulations, such as storing or deleting of map data, automatically modifying of map data by performing map data updates or by manually modifying map data according to the present invention. For this purpose, the input device may comprise a touch-sensitive screen, a key board, a mouse and/or voice recognition system for allowing speak inputs.

The output unit 1030 is configured to visualize map data, to output guidance instructions, information about pre-calculated routes between a start and end point, and so one. For this purpose, the output device may comprise optical and acoustical components (such as a screen and loudspeaker) in order to provide optical and acoustical outputs.

The units 1020 to 1080 are communicatively connected to the core functionality 1010 for information exchange. The detection unit 1050 and the determination unit 1060 can be realized as software sub-modules integrated in the core functionality 1010 or as hardware modules having appropriate software routines are in mutual communication with each other and with the core functionality 1010. The core functionality manages the data transfer between the corresponding modules 1020 to 1080.

The functioning of the detection unit 1050 and the generation unit 1060 is discussed in more detail in connection with the flow diagram represented in FIG. 2.

Figure 2:
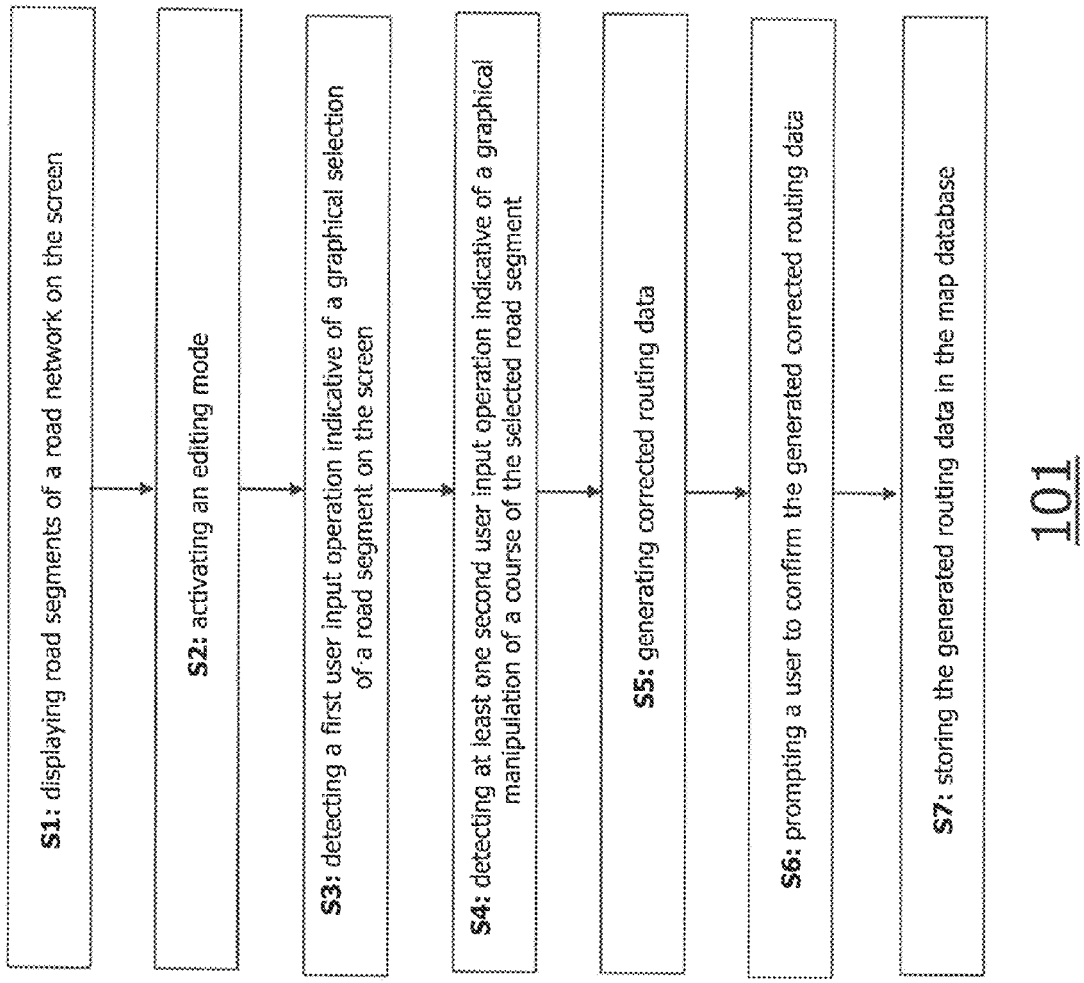
FIG. 2 illustrates a schematic representation of a method according to an exemplary embodiment of the present invention.

FIG. 2 shows a flow diagram 101 of an method embodiment for correcting digitized map data stored in a map database, which method is now explained exemplarily on the basis of the device 1000 represented in FIG. 1. The method as described in the following can be performed while a route guidance function is active. Alternatively, the method can be also performed when a route guidance is inactive or interrupted.

In the following it will be assumed that the input 1020 and output unit 1030 are realized by a touch-sensitive screen. However, the principles of the claimed invention are not limited to a touch-sensitive screen (in the following simply denoted as screen 1020) and also work with other input devices such as a mouse.

In a first step S1, a road network of a specific geographic area of interest is visualized on the screen 1020 by retrieving from the database corresponding map data and subjecting them to a rendering procedure as commonly known by a person skilled in the art. The visualized interested geographic area is automatically set by the navigation device during route guidance. For instance, the device 1000 may adjust the visualized geographic area such that the entire pre-calculated route is visible. Alternatively, for resolution purposes the navigation device may restrict the visualized geographic area to a neighborhood of the detected current position during route guidance. Alternatively, or in addition thereto, the geographic position may be manually adjusted by the user.

Further, during route guidance along a pre-calculated route the device 1000 additionally visualizes the detected current user position relative to the visualized map data. The visualization of the current user position on the screen helps to localize the user's position on the visualized map. Further, the user position is continuously updated by the device 1000 so that the user can continuously monitor on which road segment the user is currently travelling.

During travelling (along a pre-calculated route) the user can encounter situations in which the displayed road network or the outputted maneuver instructions do obviously not correspond to the course of the road the user is currently travelling (cf. also description below in conjunction with FIGS. 3 and 4). Or the user recognizes that the visualized user position on the screen is jumped from one visualized map road to an adjacent map road.

In order to provide a manual correction of map data for such situations the user can switch into an editing mode on the navigation device. For this purpose, an editing mode function is implemented in the device 1000. In a second step S2, the user selects the editing mode by, for instance, selecting a displayed editing mode function icon on the screen 1020. Other selection options of the editing mode are also conceivable. Upon receiving the user's editing mode selection input, the core functionality 1010 activates the editing mode. The activation comprises activating the detection unit 1050 for determining the subsequent user inputs and activating the determination unit 1060 for tracking user manipulations. In addition, according to one implementation, additional instructions guiding the user during the graphical data correction may be generated and outputted (for instance, in form of pop-up menus or sub-menus or windows containing prompts or instructions with regard to how modifications can be performed). Still according to another implementation, the editing mode is graphically indicated by changing the colors of the visualized map or by indicating on the display that the editing mode is activated. Still further, upon activating the editing mode, the route guidance can be temporarily interrupted or continued.

In a subsequent third step S3, after the editing mode has been activated, the user is prompted to select at least one of one or more displayed road segments and junction nodes. Upon detecting a touch input selecting a road segment the detection unit 1050 identifies the selected road segment. Based on the identified road segment selection, shape points and shape lines connecting adjacent shape points that are associated with the selected road segment are made visible on the screen 1020. The sequence of shape points and the shape lines between the shape points define the geometric road line of the road segment. Depending on the map data supplier shape points are available in distances between 10 to 40 meters. The displayed shape points and shape lines are now editable, i.e., modifiable. In addition, or alternatively thereto, the user can also select a junction node (i.e. route node) for further corrections. In such a chase the displayed junction node is editable.

In a subsequent fourth step S4 the user can individually move each shape point of the selected road segment on the screen in order to correct the course of the selected road segment. The user can drag and drop each selected shape point individually to a new screen position. Alternatively, or in addition thereto the user can move simultaneously two adjacent shape points over the screen by dragging and dropping a link line connecting the corresponding shape points. According to a further variant, the user can group two or more shape points or the whole sequence of shape points for a common manipulation. Still according to another variant the user can move, rotate, stretch and shrink the whole road segment resulting in a corresponding movement of the sequence of shape points representing the road geometry (i.e., the course) of the road segment.

In all variants, the determination unit 1060 tracks the position movement of the shape points on the screen and determines the new screen position of each modified shape point. In a subsequent fifth step S5, the determination unit 1050 determines new geographic coordinates of each modified shape point on basis of the detected new screen positions. The generation of the new geographic coordinates is performed using a unique relationship between each screen position and the underlying displayed map data which represents a portion of a geographic area that is associated with unique latitude and longitude coordinates of a global (or local) coordinate system. The newly generated geographic coordinates for the moved shape points reflects the geographical displacement of the shape points of the selected road segment relative to the displayed map. In addition, the same moving, tracking and determining procedure as described for shape points applies for junction nodes.

After tracking the movement of the displayed shape points and/or junction nodes on the screen and assigning new geographic coordinates to the moved shape points, the core functionality 1010 prompts the user to confirm the performed corrections (sixth step S6).

In case the user confirms the correction, the determination unit 1050 stores in a subsequent seventh step S7 the new shape point data (new coordinate data for the moved points) in the database by overwriting the old geographic coordinates of the shape points or junction nodes. Since the course correction of road segments only involves a modification of stored shape point data of already available and organized shape points, the provided correction constitutes a "soft correction" that does not require modifications in the original map database structure. The map database structure before and after the modification are substantially the same, since data are only overwritten without affecting the size or the organization of the database elements (i.e., the relation between database elements such as links and nodes). Hence, the correction technique described in conjunction with FIG. 2 involves a correction of existing map data that are made available by the map data supplier and that are stored in the map database of the navigation device.

Figure 3B:
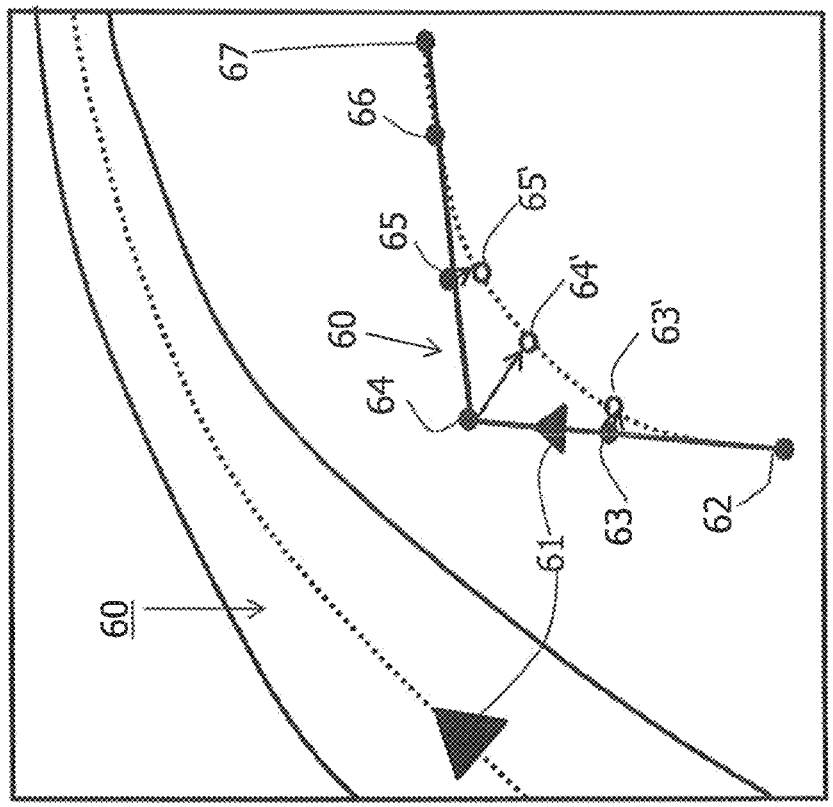
FIGS. 3a/3b illustrate a further embodiment of correction of digitized map data.
Figure 3A:
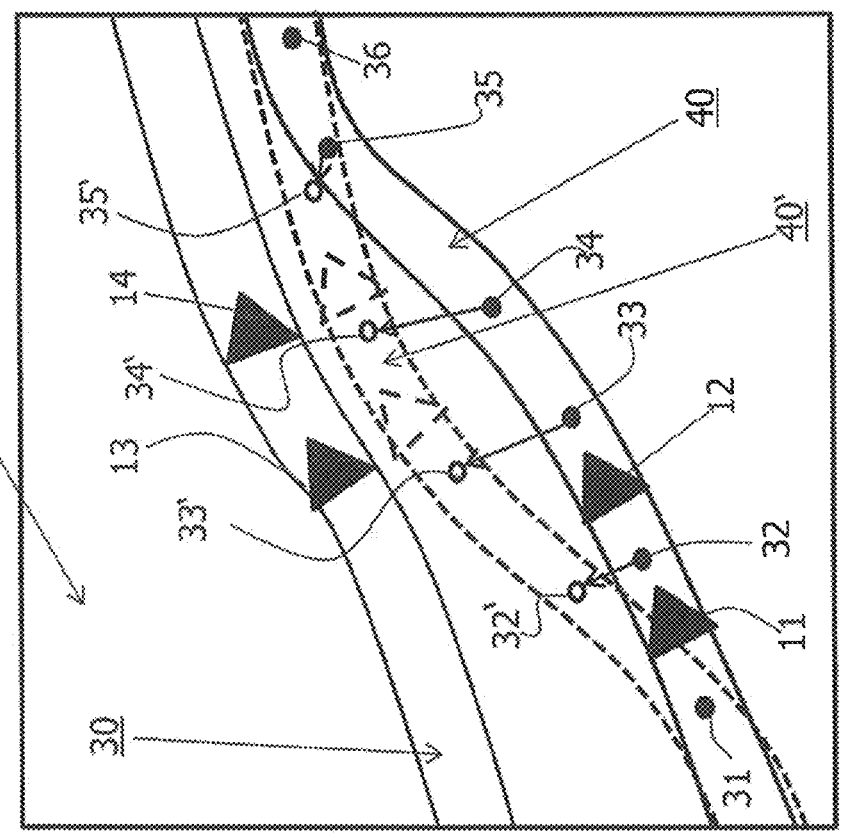

In the following, the correction technique for inaccurately digitized map data or outdated map data on basis of shape point manipulation will be described in more detail in conjunction with the FIGS. 3 and 4. FIG. 3a shows a situation in which a jump of the displayed current user position to a neighboring road is observed during route guidance. FIG. 3b shows a situation in which the road bending does obviously not correspond to the current road geometry. FIGS. 4a to 4c represent a situation in which an old cross-like junction has been transformed in a roundabout which was not updated so far by map data updates. In all these situations the user can manually adjust the map data to the up-to-date road geometry configuration without having to wait until the correct data adjustment have been met by updates.

FIG. 3a shows a rendering 100 of a road network portion comprising two independent road portions 30, 40 (cf. thick line) on basis of the stored digitized map data. The real course of road 40 deviates from the digitized data and is illustrated by the dashed road course 40'. The digitized map data suggest an S-shaped course which is further away from the road 30 than the arch-shaped real road course. When the shown road portion 40 is part of a pre-calculated route and the user is travelling along the route, it may happen that the displayed user position (cf. sequence of full triangles 11-14 showing the actual movement of the user position during route travel) is first correctly matched to road 40 (positions 11, 12) on which the user is travelling, and suddenly jumps to the neighboring road 30 and remains matched to road 30 for a longer time (positions 13, 14 in FIG. 3a). Such a jump is the result of an imprecise digitalization of the course of road 40, since the neighboring road 30 is closer to the position measured by the position sensor so that a matching algorithm chooses this road 30 for matching rather than the real road 40 on which the user is travelling. As a consequence of a wrong matching, a re-routing is initiated associated with an output of wrong maneuver instructions which might disturb and confuse the user, since the road 30 is not part of the predetermined road. In addition, the jump to neighboring roads might confuse the user and leave the user in doubt as to which displayed road the currently driven road belongs to.

To immediately remedy such a confusing situation the user can switch to the editing mode and perform the procedure as described in conjunction with the flow diagram 100 in FIG. 2. As a reference for the correction of the wrongly digitized course the displayed user position can be used. In the editing mode, the matching algorithm might be set to be inactive so that the real measured user position (indicated by the dashed triangles in FIG. 3a) is displayed on the screen 1030 without matching it to a road. The user can observe the course of the visualized user position and use this position for manually correcting the course of the wrongly digitized road segment. As already discussed above in conjunction with FIG. 2, the correction can be simply manually performed by selecting and dragging those shape points 32-35 (cf. shape points 31 to 36), which reflect the wrongly digitized course of the road segment to a screen position which corresponds to the geographic positions as indicated by the position sensor. Since a more complex manipulation on a touchscreen might be difficult to perform during travelling, the real geographic position measurements of the position sensor can be recorded during travel while the editing mode is active. The recorded user position data forms a trace which reflects the real course of the road segment. This trace can be loaded and displayed on the screen (also after travelling or when having a rest) and used as reference for manually correcting the wrongly digitized road segment data. The arrows in FIG. 3a illustrate how the shape points 32 to 35 have to be moved to screen positions (and map positions 32' to 35') in order to reproduce the real course of road 40. It is important to note that the road course correction according to the present invention can be fully performed by appropriately moving the shape points 32 to 35 relative to the displayed map such that they are reflecting the real road course. The sequence of new geographic coordinates of the shape points represents the new road course. The shape lines between adjacent shape points move automatically and need not to be corrected manually, since the shape lines only represent a connection between two adjacent shape points, to which they refer. The reference relation between the shape lines and shape points always remains unchanged by the graphical correction. In other words, the graphical manipulation effects that the geographic position of the manipulated shape points are changed but it does not affect the reference relation between shape lines and shape points. This is also valid for junction nodes and route links, since a displacement of a junction node only changes the geographic position data of the modified junction node, but not its relation to the joining route nodes. As such the provided modification technique leaves invariant the basic relations between shape points, shape lines and junction nodes and therefore the basic data structure of the map database.

FIG. 3b shows another situation associated with incorrect digitalization of the course of a road segment 60. The picture shows the street course as perceived by the user. The inset picture on the bottom left shows a visualization of the road geometry derived from stored digitized map data. The triangle 61 denotes the current position of the user on the road. While the real road course shows a slight right bending, the visualized digitized data suggest a sharp right turn. There is obviously a major discrepancy between the real street course and the digitized road data which might cause trouble to the user. The predicted sharp right curve may make unsecure the user, since the user expects a steep turn which in reality does not exist. Furthermore, an instruction indicative of a sharp right turn may be outputted (user warning) which may additionally attract the user's attention to the upcoming maneuver. In order to correct such a bad digitalization of the road course the user can again switch to the edit mode and perform the above-described manipulation by simply selecting and dragging the visualized shape points 62-67. In the present case, the user will defuse the predicted sharp convex-shaped turn by simply dragging the shape points 63-65 inwards to the positions 63'-65' for smoothing the curve (cf. arrows illustrating the direction in which the shape point are displaced in order to smooth the sharp turn). The course correction or modification can be performed freehand and without reference imitating therefore qualitatively the course of the real road as noticed by the driver. Alternatively, the displayed user position as detected by the sensor (GPS, Galileo) can be used as reference for route course correction as described above. In this case the shape points 62-67 are dragged to the map positions 63'-65' on which the position sensor position appears. Still according to another variant, a real image of the corresponding road segment, if available, can be superimposed with the visualized road segment and used as correction reference. The shape points 62-67 are moved to correspond with the course as derivable form the superimposed image. Such an image can be retrieved from street image providers (Google street view) or provided by recording an image of the street course during travel.

Figure 4C:
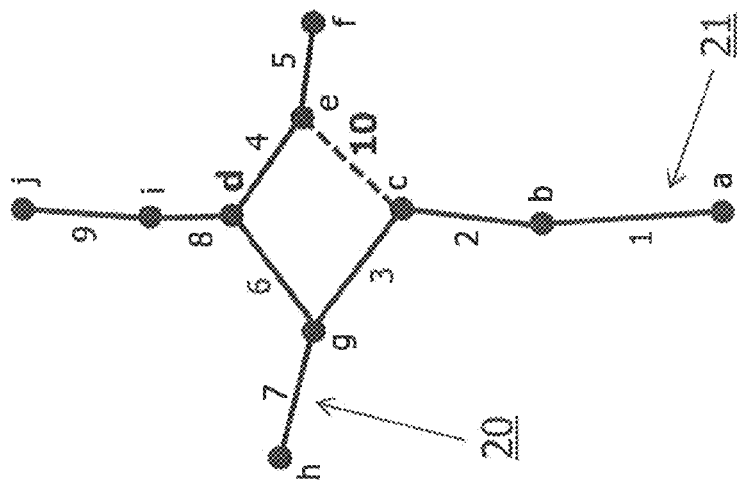
FIGS. 4a-4c illustrate a further embodiment of a correction of digitized map data.
Figure 4B:
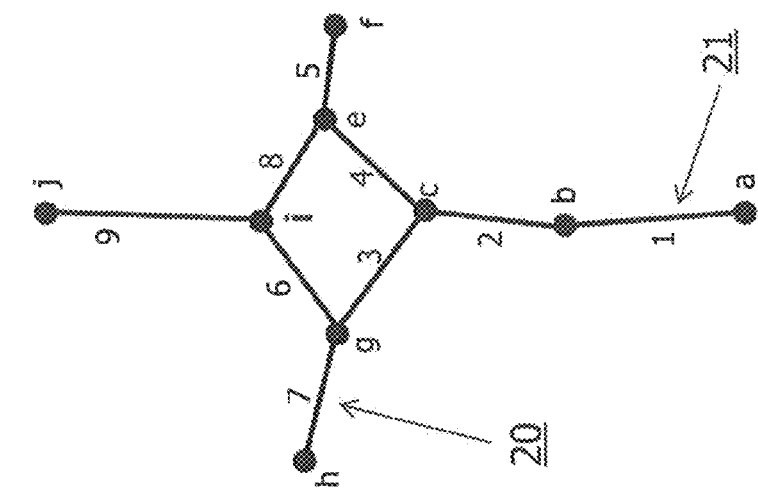
Figure 4A:
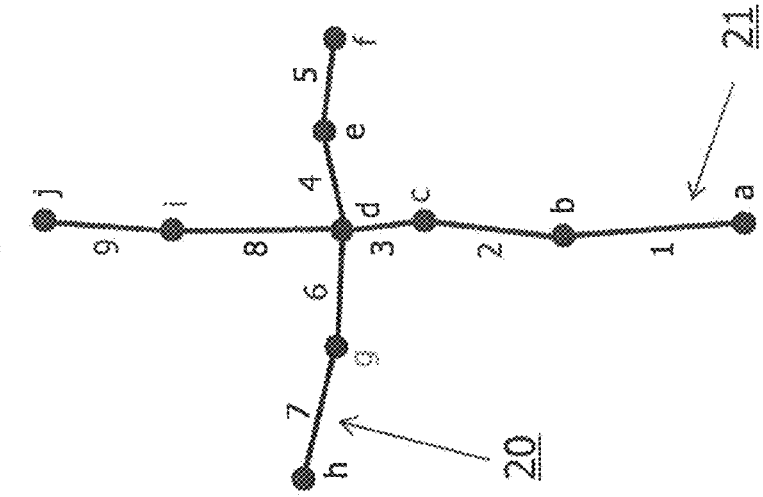

In FIGS. 4a to 4c another situation is illustrated in which the road network as predicted by the stored digitized map data does not comply with a real road network configuration. The situation concerns a transformation of a cross-like junction into a roundabout. FIG. 4a shows two crossing roads 20, 21 crossing at the junction node d. The road geometry of road 21 is described by the shape point sequence a, b, c, d, i, j and the corresponding shape lines 1, 2, 3, 8, 9 connecting each adjacent shape points of the sequence. Road 20 is described by the shape point sequence d, e, f, g, h and the shape lines 4, 5, 6, 7.

For the shown road junction configuration the creation of a roundabout geometry can be easily performed by simply moving the shape point i of the road 21 in the shown new position of FIG. 4b (cf. shape point i indicated in bold). In addition the already existing shape lines 3, 4, 6, 8 which are all referencing to the node d are changed to reference to the respective shape points c, g, i, e to form the link configuration as shown in FIG. 4b. Further, the links lines 3, 4, 6, 8 are attributed to be a "roundabout link". Such change in the link attributes can be also performed graphically using a specific graphic attribute changing mechanism provided by the device 1000 in association with editable links in the editing mode. For instance, it is conceivable that the graphic attribute changing mechanism comprises the displaying of a pop-up menu in response to a detected long-period selection operation for selecting one of the shape lines 3, 4, 6, 8. Via the pop-up menu the user can indicate for each shape line 3, 4, 6, 8 individually (for instance by setting a flag) that the lines 3, 4, 6, 8 are belonging to a roundabout. In sum, although a roundabout is a geometric configuration which fundamentally differs from a cross-like junction, it can be created by simply using the existing links and shape point data. It is clear that the reverse transformation of a roundabout into a cross-like junction works in the same way. It is further noted that the transformation variant of FIG. 4b leaves unused the shape point d. This shape point can remain in the database as unreferenced data element or, alternatively, it can be graphically deleted in case the database allows such a deletion by users (i.e., is not configured to block an active deletion of database elements). Since shape point d represents an unreferenced data element, it does not further disturb navigation functionalities.

According to an alternative variant shown in FIG. 4c a roundabout can be also graphically created from the displayed links and shape point data representing the cross-shaped junction of FIG. 1 by moving the shape point position of shape point d in a direction to the position of shape point i (new position of shape point d indicated in bold in FIG. 4c). The movement of the position d affects that the shape line 8 is (automatically) shortened. In addition, through the reference to the shape point d, the shape lines 4 and 6 already form an appropriate portion of the new roundabout configuration (i.e., first half of new roundabout defined by shape point sequence d, e, g and shape lines 4, 6). The other portion (i.e., second half) of the roundabout can be easily graphically generated by changing the reference of line 3 from shape point d to shape point g and by graphically introducing a new shape line 10 which references to shape points c and e in order to form an appropriate connection in-between (cf. dashed line in FIG. 4c). Of course, a similar transformation result can be also achieved by moving shape point d in another direction. Further, the manipulation of link attributes of the shape lines 3, 4, 6, 10 involved in forming the roundabout may be performed in the same way as described above in association with the roundabout generation of FIG. 4b.

As demonstrated in FIG. 4b the creation of a roundabout does not necessarily require to generate and incorporate new map elements, such as shape points and links into the existing database (i.e., the original database as provided by the map data supplier). Rather, an appropriate manipulation of the position of existing shape points and an appropriate change in the link referencing is sufficient for transforming a cross-like junction configuration into a roundabout configuration and vice versa. Remaining unused shape points may remain as unreferenced data elements in the database. The advantage of manipulating only existing map data elements (without adding new or deleting existing data elements) is that the database structure, especially the reference structure between the stored elements remains substantially unaffected by the modification avoiding therefore compromising of the data consistency and other data corruptions in the map database.

Of course, when a database is provided in a format (like the NDS format) which also supports a user-based adding and deleting of map data elements, new shape points and links can be graphically added or deleted (FIG. 4c). This can be done by graphically marking (for instance, by a long-period selection operation) shape points or links to be deleted or by selecting a screen position which corresponds to a map position of a selected road segment for adding a shape point and/or shape lines. In case shape points and/or shape lines are allowed to be added to the database the roundabout geometry can be reproduced more detailed. However, on the other hand, the addition of shape points or links increases the probability of data corrupt-tions or data inconsistencies in case the newly added elements are not reliably incorporated in the existing database structure by defining appropriate references between the new elements and the existing data elements.

Figure 5:
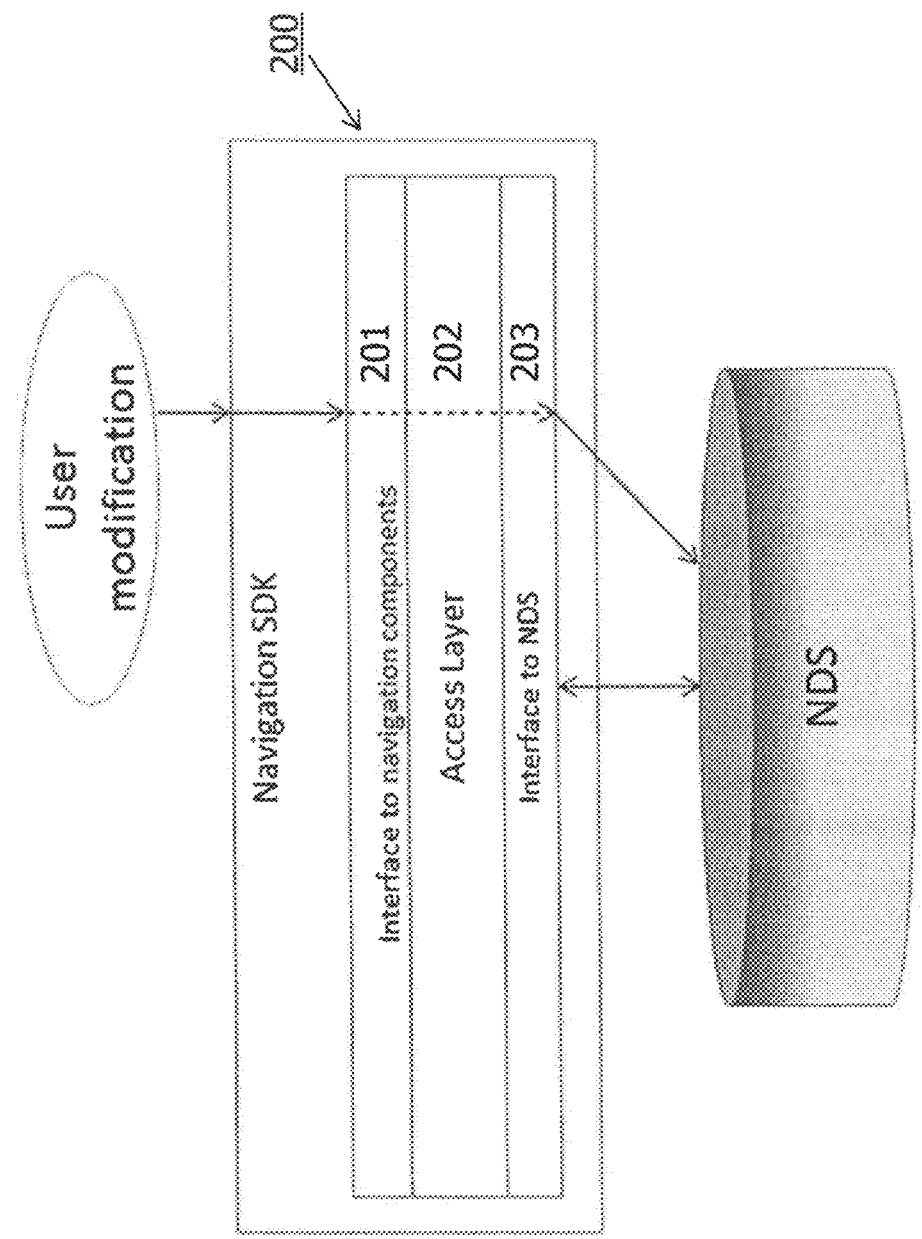
FIG. 5 illustrates an implementation embodiment of the method of FIG. 2 in the context of the Navigation Data Standard, or NDS, data format.

In conclusion, in FIG. 5 the described database correction technique will be discussed in conjunction with the NDS database standard. NDS stores map data in form of relational tables in a binary or textual format. In addition, the map data are organized in updatable sub-units which represent map data of a local geographic area of limited size (so called tiles as described above). FIG. 5 shows a NDS map database 1040 being accessible via a navigation software developer kit 200 (navigation SDK). The navigation SDK 200 comprises an interface 201 to navigation components (i.e., interface to navigation functionalities, like routing, map matching, map displaying, route guidance, etc.), an access layer 202 and an interface 203 to the NDS database. The access layer is in communicative connection with the interfaces 201, 203 and is designed to convert NDS data structures received from the interface 203 into data structures used by the navigation functionalities inside the navigation device 1000. In the same way the access layer 202 is designed to convert data received from the navigation functionalities over the interface 201 and to convert it to NDS data format. When the user is performing a graphical modification on the displayed map as described in conjunction with FIGS. 2 to 4, new routing data generated by the generation unit 1060 is transferred into the navigation SDK 200. The access layer 202 converts the modified data into NDS format (binary or textual format). The NDS converted data are then stored in the NDS database (cf. right path as indicated by the arrows in FIG. 5). When using textual format, the generated corrected routing data can replace the corresponding textual data. When using binaries, the conversion needs to extract the binary data, update the relevant parts and recreate the binary blob, and store it then back into the NDS database 1040. Regarding route links the mechanism also needs to take into account the connection to other route links during modification. The links need to get updated for allowing route calculations. This is obtained via the references to the route links.

While the technique presented herein has been described with respect to particular embodiments, those skilled in the art will recognize that the present invention is not limited to the specific embodiments described and illustrated herein. It is to be understood that this disclosure is only illustrative. Accordingly, it is intended that the present invention be limited only by the scope of the claims appended hereto.

The invention claimed is:

1. A method of correcting digitized map data provided by a map data supplier and stored in a map database of a navigation device, the map data comprising routing data in the form of route links and shape points, wherein each route link is associated with a sequence of shape points representing a course of a road segment for display on a screen, the method comprising the steps of:
   switching to an editing mode indicating to the user that at least one of displayed road segments and/or shape points can be graphically manipulated on the screen and providing to the user a map data correct reference by displaying a current user position on the screen without matching the user position to the nearest neighboring road segment of the displayed road network by setting a matching algorithm inactive;
   detecting a first user input operation indicative of a selection of a road segment displayed on the screen;
   displaying on the screen, based on the map data provided by the map data supplier, at least one existing shape point of the sequence of shape points stored in the map database for the selected road segment;
   detecting at least one second user input operation indicative of a graphical manipulation of the course of the selected road segment on the screen, wherein the graphical manipulation comprises a positional displacement of at least one existing shape point of the sequence of shape points displayed on the screen by shifting the at least one existing shape point from the displayed screen position to a new screen position;
   generating on basis of the detected second user input operation corrected routing data reflecting the manipulated course of the selected road segment; and
   storing the corrected routing data in the map database by overwriting the existing routing data of the selected road segment by the generated corrected routing data without modifying a structure of the original map database provided by the map data supplier,
   wherein the corrected routing data in the map database is subsequently employed for one of a route guidance process, a map displaying process and a map matching process.

2. The method according to claim 1, wherein the generating step comprises converting a detected new screen position into new geographic coordinates for the displaced shape point.

3. The method according to claim 1, wherein the graphical manipulation of the course of the selected road segment comprises a collective positional displacement of two or more shape points of the road segment by shifting at least a portion of the displayed road segment from the displayed screen position to a new screen position.

4. The method according to claim 1, wherein detecting the at least one second user input comprises tracing the displacement of each shape point and detecting a new screen position for each displaced shape point.

5. The method according to claim 4, wherein the generating step comprises converting the detected new screen positions into new geographic coordinates for the displaced shape points.

6. The method according to claim 5, wherein said overwriting the existing routing data of the selected road segment by the generated corrected routing data comprises replacing stored shape point geographic position data by the detected new shape point geographic position data.

7. The method according to claim 1, wherein shape points associated with the displayed road segments are displayed when the editing mode is activated.

8. The method according to claim 1, wherein the editing mode is accessible while a route guidance is active.

9. The method according to claim 1, further comprising providing a map data correction reference by superimposing real images on a road network map portion displayed on the screen.

10. The method according to claim 1, wherein the routing data further comprises route node data representing junctions of a road network, wherein displayed junction nodes can be selected on the screen by the first user input, wherein the selected junction nodes can be further moved from a displayed screen position to a new screen position, and further comprising:
    generating on basis of the detected second user input geographic position data for the route nodes corresponding to the detected new screen position of the moved junction node; and
    storing the generated geographic position data in the database.

11. A non-transitory computer-readable recording medium storing a computer program product comprising program code portions for performing the steps for a method of correcting digitized map data provided by a map data supplier and stored in a map database of a navigation device, the map data comprising routing data in the form of route links and shape points, wherein each route link is associated with a sequence of shape points representing a course of a road segment for display on a screen, the steps comprising:
   switching to an editing mode indicating to the user that at least one of displayed road segments and/or shape points can be graphically manipulated on the screen and providing to the user a map data correct reference by displaying a current user position on the screen without matching the user position to the nearest neighboring road segment of the displayed road network by setting a matching algorithm inactive;
   detecting a first user input operation indicative of a selection of a road segment displayed on the screen;
   displaying on the screen, based on the map data provided by the map data supplier, at least one existing shape point of the sequence of shape points stored in the map database for the selected road segment;
   detecting at least one second user input operation indicative of a graphical manipulation of the course of the selected road segment on the screen, wherein the graphical manipulation comprises a positional displacement of at least one existing shape point of the sequence of shape points displayed on the screen by shifting the at least one existing shape point from the displayed screen position to a new screen position;

generating on basis of the detected second user input operation corrected routing data reflecting the manipulated course of the selected road segment; and storing the corrected routing data in the map database by overwriting the existing routing data of the selected road segment by the generated corrected routing data without modifying a structure of the original map database provided by the map data supplier, wherein the corrected routing data in the map database is subsequently employed for one of a route guidance process, a map displaying process and a map matching process.

12. A navigation device configured to correct digitized map data provided by a map data supplier and stored in a map database of the navigation device, the map data comprising routing data in the form of route links and shape points, wherein each route link is associated with a sequence of shape points representing a course of a road segment for display on a screen, the device comprising:

a processor configured to switch to an editing mode indicating to the user that at least one of displayed road segments and/or shape points can be graphically manipulated on the screen and provide to the user a map data correct reference by displaying a current user position on the screen without matching the user position to the nearest neighboring road segment of the displayed road network by setting a matching algorithm inactive;

a detection unit configured to detect a first user input operation indicative of a selection of a road segment displayed on the screen, and to detect at least one second user input operation indicative of a graphical manipulation of the course of the selected road segment on the screen;

a display unit with the screen configured to display, based on the map data provided by the map data supplier, at least one existing shape point of the sequence of shape points stored in the map database for the selected road segment;

a generation unit configured to generate on basis of the detected second user input operation corrected routing data reflecting the manipulated course of the selected road segment; and a storage unit configured to store the corrected routing data in the map database, wherein the graphical manipulation comprises a positional displacement of at least one existing shape point of the sequence of shape points and the detection unit is configured to detect a shifting of the at least one existing shape point from the displayed screen position to a new screen position, wherein the storage unit is configured to overwrite the existing routing data of the selected road segment by the generated corrected routing data without modifying a structure of the original map database provided by the map data supplier, and wherein the corrected routing data in the map database is subsequently employed for one of a route guidance process, a map displaying process and a map matching process.

13. The device of claim 12, wherein the display unit is configured to display on the screen road segments and road junctions on basis of the stored map data.

* * * * *